United States Patent
Pan et al.

(10) Patent No.: US 6,178,058 B1
(45) Date of Patent: Jan. 23, 2001

(54) OFF-TRACK WRITE PROTECTION METHOD AND SYSTEM FOR INDUCED MECHANICAL DISTURBANCE ON A DISK DRIVE

(75) Inventors: Weimin Pan; Allen T. Bracken, both of Layton; John R. Stokes, Ogden, all of UT (US)

(73) Assignee: Iomega Corporation, Roy, UT (US)

( * ) Notice: Under 35 U.S.C. 154(b), the term of this patent shall be extended for 0 days.

(21) Appl. No.: 09/209,867

(22) Filed: Dec. 11, 1998

(51) Int. Cl.[7] .............................. G11B 15/04; G11B 5/596
(52) U.S. Cl. ........................................... 360/60; 360/77.02
(58) Field of Search .................................... 360/60, 77.05, 360/77.08, 31, 53, 77.02; 369/53, 44.33

(56) References Cited

U.S. PATENT DOCUMENTS

| | | | |
|---|---|---|---|
| 5,126,895 | * 6/1992 | Yasuda et al. | 369/44.33 |
| 5,333,138 | 7/1994 | Richards et al. | 371/7 |
| 5,491,394 | 2/1996 | Harwood et al. | 318/563 |
| 5,696,645 | 12/1997 | Laughlin | 360/75 |
| 5,909,330 | * 6/1999 | Carlson et al. | 360/60 |
| 5,923,488 | * 7/1999 | Ino | 360/60 |
| 6,018,431 | * 1/2000 | Carlson et al. | 360/60 |

\* cited by examiner

Primary Examiner—W. Chris Kim
(74) Attorney, Agent, or Firm—Woodcock Washburn Kurtz Mackiewicz & Norris LLP

(57) ABSTRACT

A method and apparatus for protecting a disk from overwrites during mechanical shock. If the PES exceeds an off-track threshold for a predetermined number of servo samples, the read/write is suspended for a predetermined duration. The predetermined duration allows for the mechanical shock or disturbance to abate and allows the heads to settle with respect to the track. The off-track threshold being exceeded for several servo samples is used as an indicator of the mechanical force and subsequent undesirable vibration. The writes can then be suspended for the predetermined duration, thereby avoiding overwriting data on adjacent tracks.

15 Claims, 9 Drawing Sheets

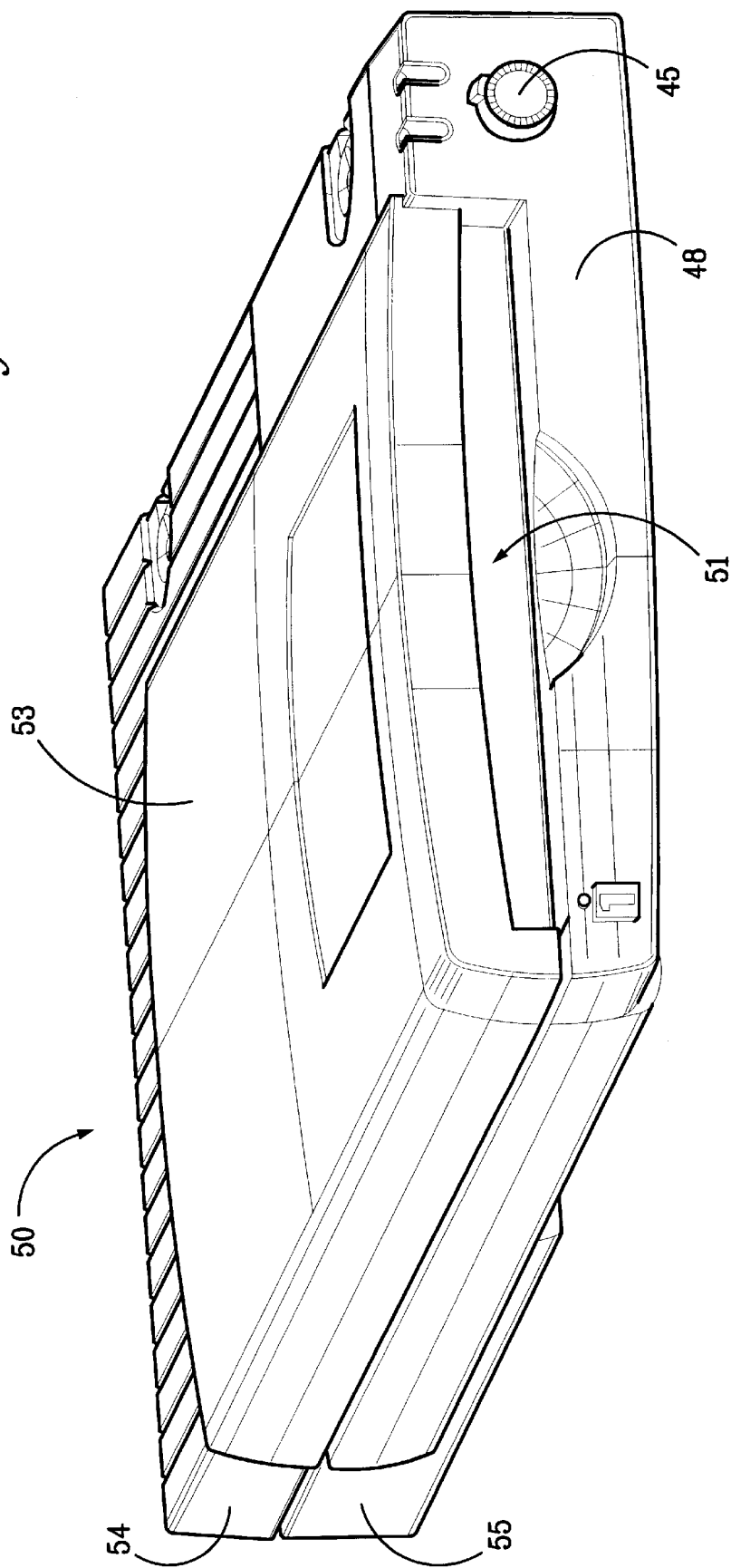

OFF-TRACK WRITE PROTECTION METHOD AND SYSTEM FOR INDUCED MECHANICAL DISTURBANCE ON A DISK DRIVE

FIELD OF THE INVENTION

The present invention relates in general to data storage devices, or disk drive storage systems, for computers. More particularly, the present invention relates to systems and methods for preventing data corruption on a disk resulting from mechanical shock experienced by the disk drive during the write process to the disk.

BACKGROUND OF THE INVENTION

Disk based data storage devices for storing digital electronic information have been in use in the computer industry for several decades. The storage devices operate by storing digital information on a disk media, such as magnetic or optical media. The disk media can be either rigid or flexible and is mounted on a rotating hub. The storage devices are commonly referred to as disk drives, and typically accommodate removable media or fixed media.

As disk diameters have become smaller, the issue of damage from mechanical shock has become a significant factor. Disk drives can be accidentally bumped, jarred, or dropped during operation. Because of their low weight, a disk drive can be subjected to a substantial amount of mechanical shock during normal operation of a computer.

One negative effect resulting from mechanical shock occurs when the drive is writing data to a disk. In this state, the head is positioned over the proper track to record the data. If the mechanical shock is severe enough to cause the head to move over an adjacent data track before the write current in the data head is turned off, the data in the adjacent track will be corrupted. This damaged data is not recoverable. Neither the computer nor the disk drive controller know what data was damaged, when and how it was originally generated, and has no way to fix the damaged data. The user will not even know data has been corrupted until a read failure is experienced at some later time. It will be too late to reconstruct the corrupted data unless it has been previously backed up. Thus, the shock force can cause a catastrophic overwrite in adjacent tracks, thereby obliterating data which had been previously written to the adjacent track. The overwrite results in serious damage to data files which significantly impairs the use of the device.

Protecting the disk from such catastrophic overwrites can only be partially alleviated through mechanical absorption and other known techniques which attempt to insulate the disk drive from such shock forces.

Many disk drives use a write protection method whereby the read/write head(s) is disabled when a position error signal (PES) of the head with respect to the center of the track exceeds some preset amount or threshold. This helps prevent off-track writes. However, during a mechanical shock, the head vibrates and bounces, thereby causing a PES that fluctuates both within and outside the range of acceptable PESs. Thus, for a time period after a shock occurs, due to vibration and bouncing, the head passes over a track and the PES is within an acceptable range. However, the head is merely passing through a track and is really moving between unacceptable PES thresholds and adjacent tracks, and just happens to be within an acceptable PES range at the PES sampling instant. Thus, the PES appears to be acceptable as the head is passing through the track, and the write is ordered. By the time the write is completed executing, however, the head will be in an adjacent track and some of the data will be written onto the adjacent track, because of the movement of the head due to the bouncing, vibrational aftermath of the mechanical shock. Thus, although the PES threshold might not be exceeded at a particular PES sampling instant, the head is passing through the track and moves into an adjacent track and writes in the adjacent track before another PES can be sampled and the write can be turned off, thereby creating a non-recoverable data error. Thus, the prior art merely detects the position of the head and does not anticipate the mechanical bouncing and vibration that can occur during and after a shock.

Many disk drives use shock sensors or accelerometers to detect a mechanical shock. However, the use of shock sensors or accelerometers is disadvantageous because of the additional hardware needed with these devices.

Although the art of disk drives is well developed, there remain some problems inherent in this technology, particularly protecting the data in adjacent tracks during a write operation when a mechanical shock or force is incurred. Therefore, a need exists for a system and method that protects against off-track writing during a disturbance that overcomes the drawbacks of the prior art.

SUMMARY OF THE INVENTION

The present invention is directed to a system and method for disabling a servo controlled read/write head of a disk drive from writing on a track of a memory media when a mechanical shock is experienced by the disk drive. An actuator servo/driver determines a plurality of consecutive position error signals (PESs) of the read/write head with respect to the track of the memory media. A comparator compares the PESs to a predetermined threshold. A counter counts a number of consecutive PESs that exceed the predetermined threshold. A signal generator generates a shock signal when said number of consecutive PESs that exceed the predetermined threshold exceeds a predetermined number. A controller disables the read/write head for a predetermined duration responsive to the shock signal.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 1 is a perspective view of an exemplary disk drive in which the present invention is embodied;

DESCRIPTION OF EXEMPLARY EMBODIMENTS AND BEST MODE

Figure 2A:
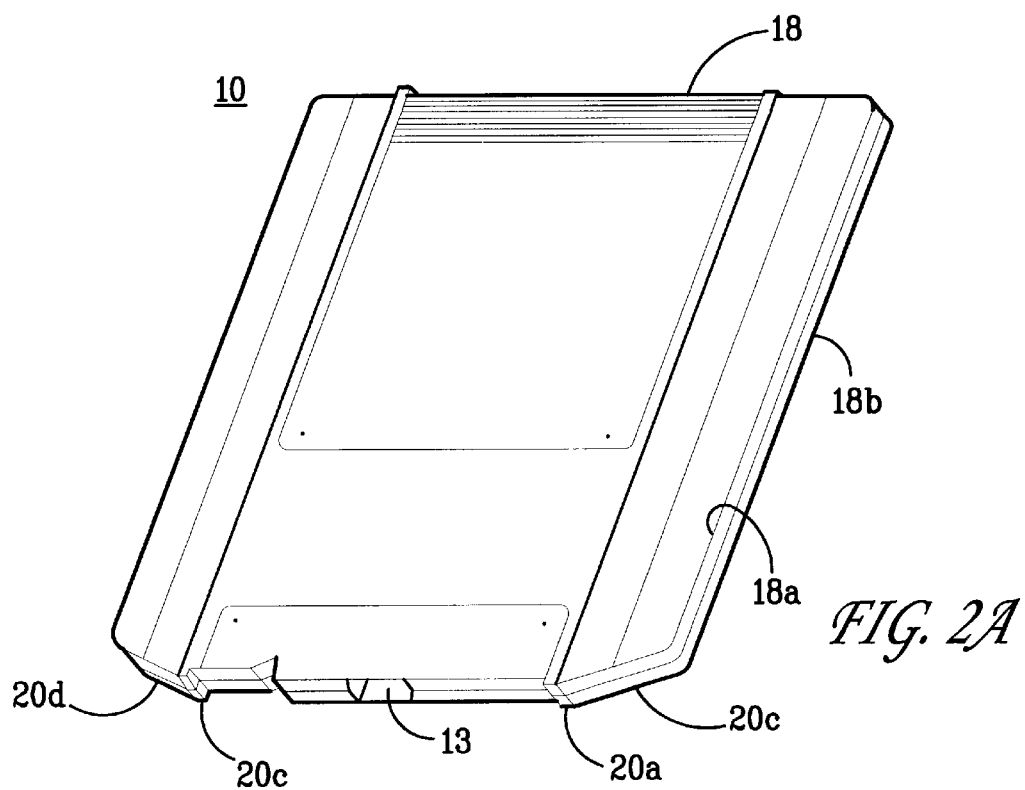
FIG. 2A is a perspective view of a disk cartridge for use with the disk drive of FIG. 1.

A method and apparatus for protecting a disk from overwrites during mechanical shock that solves the above-mentioned problems in the prior art and provides other beneficial features in accordance with the presently preferred exemplary embodiments of the invention will be described below with reference to FIGS. 1–7. Those skilled in the art will readily appreciate that the description given herein with respect to those figures is for explanatory purposes only and is not intended in any way to limit the scope of the invention.

Throughout the description, the invention is described in connection with a removable media disk drive. However, the particular disk drive and cartridge shown only illustrate the operation of the present invention and are not intended as limitations. Aspects of the invention are equally applicable to other disk drives including linear or rotary actuator disk drives, fixed medium drives, and removable medium disk drives as well as differently sized and shaped disks and disk cartridges. Accordingly, the invention should not be limited to the particular drive or disk embodiment shown as the invention contemplates the application to other drive and disk types and configurations. Throughout the following detailed description similar reference numbers refer to similar elements in the figures of the drawings.

The present invention is directed to a method and apparatus for protecting against data overwrites of neighboring data tracks of a data storage media during mechanical shock. As described in further detail below, a disk drive determines that a mechanical shock has occurred and suspends read/write operations for a predetermined time.

FIGS. 1 and 2A–2D are drawings of an exemplary disk drive device 50 and disk 10 for use with the present invention. The drive 50 may be the Iomega ZIP drive which is disclosed and claimed in the U.S. patents identified in U.S. Pat. No. 5,638,228. The drive 50 may be adapted for removable connection to a computer device or may be built-in to a computer device (not shown). The drive 50 may have a protective case, such as protective case 53, having an upper case 54 and a lower case 55, which forms an interior space for accepting disk cartridge 10 or a cartridgeless media, such as an optical compact disk (CD). The upper case 54 and lower case 55 are preferably formed from molded plastic. The lower case 55 has a bottom surface and side surfaces, and upper case 54 is formed so that it covers the top of lower case 54. The width of the case 53 is sized accordingly such that space is available within case 53 to accommodate a disk cartridge as well as a disk drive mechanism and an electronics system. A disk cartridge 10 can be inserted into the disk drive 50 through a horizontal opening 51 in the front panel 48 of the disk drive 40. An eject button 45 is also provided on the front panel 48 for automatically ejecting a disk cartridge from the disk drive 40.

Figure 2B:
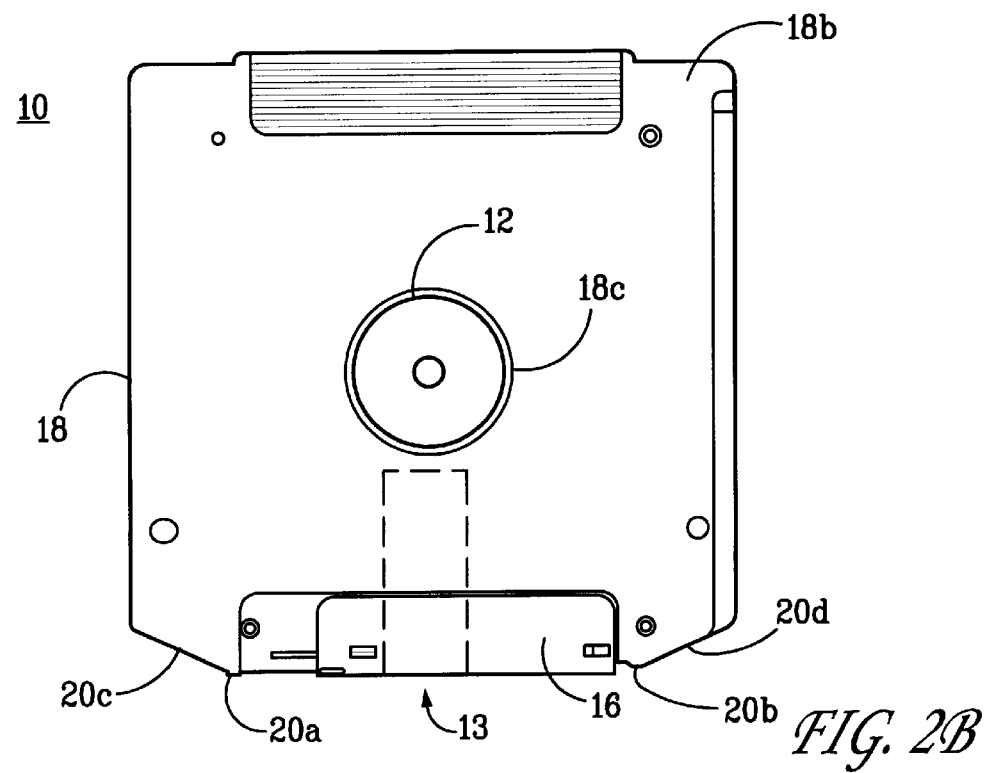
FIG. 2B is a bottom view of the disk cartridge of FIG. 2A.

FIGS. 2A and 2B show an exemplary disk cartridge 10 adapted for use in the disk drive 50 of FIG. 1. As shown, the disk cartridge 10 comprises an outer casing 18 having upper and lower shells 18a, 18b that mate to form the casing. A disk-shaped recording medium 14 is affixed to a hub 12 that is rotatably mounted in the casing 18. An opening 18c on the bottom shell 18b of the casing 18 provides access to the disk hub 12. A head access opening 13 in the front peripheral edge of the disk cartridge 10 provides access to the recording surfaces of the disk by the recording heads of the disk drive. A shutter 16 is provided on the front peripheral edge of the disk cartridge 10 to cover the head access opening 13 when the cartridge is not in use. When the cartridge is inserted into the disk drive, the shutter 16 moves to the side exposing the head access opening 13 and thereby providing the heads of the drive with access to the recording surface of the disk. In the present embodiment, the casing houses a flexible or floppy magnetic disk, however, in other embodiments, the disk may comprise a rigid magnetic disk, a magneto-optical disk or an optical storage medium.

The opposite front corners of the disk cartridge 10 have a non-square shape defined by angled surfaces 20c, 20d that angle away from the front peripheral edge of the cartridge at a predetermined angle. Additionally, a pair of projections 20a, 20b are formed on the front peripheral edge of the cartridge. Each projection 20a, 20b is formed adjacent a respective one of the angled surfaces 20c, 20d at the point where the respective surface 20c, 20d begins to angle away from the plane of the front peripheral edge of the cartridge 10.

Figure 2C:
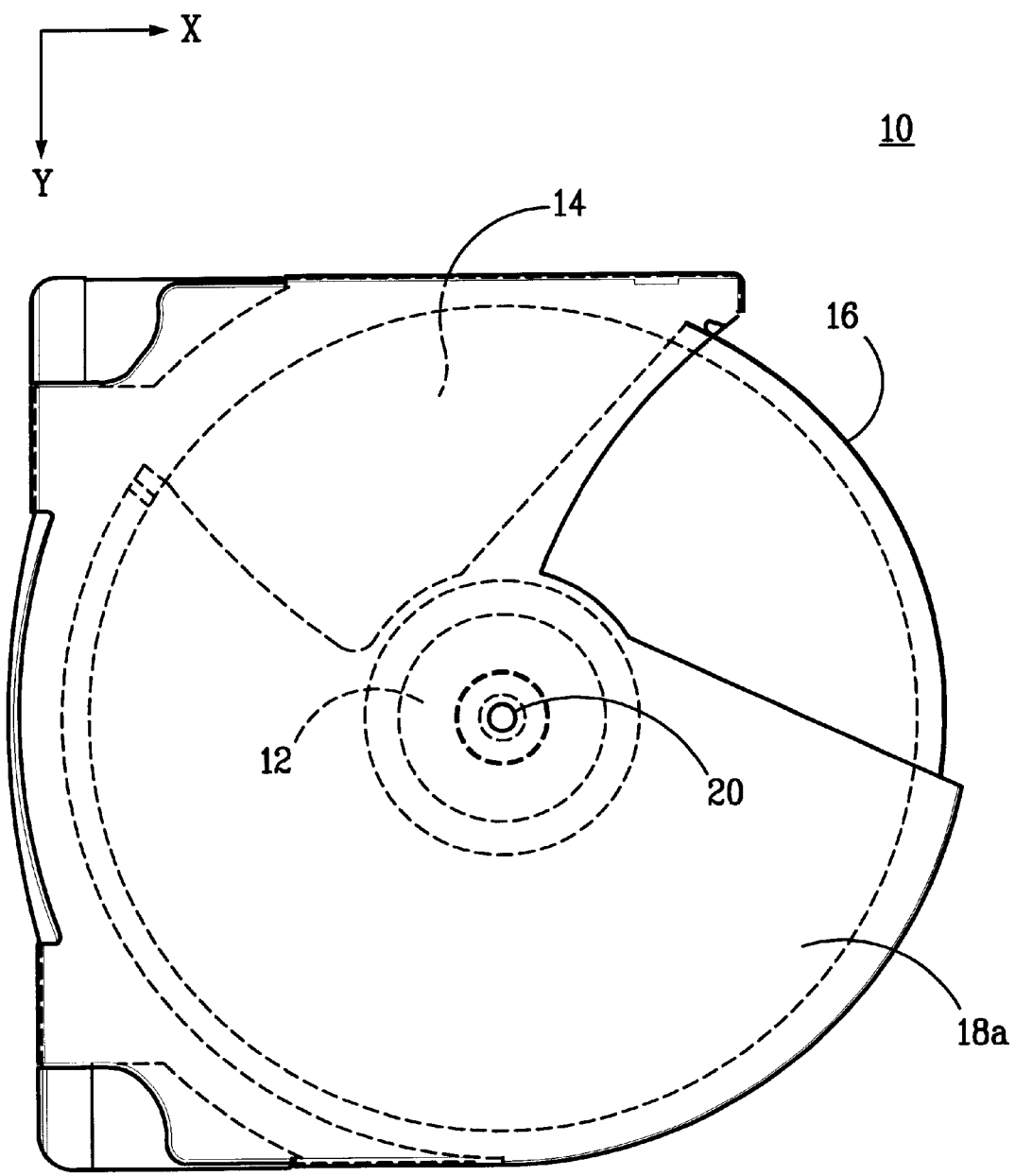
FIGS. 2C and 2D are top and bottom views of another exemplary disk cartridge for use with the present invention.
Figure 2D:
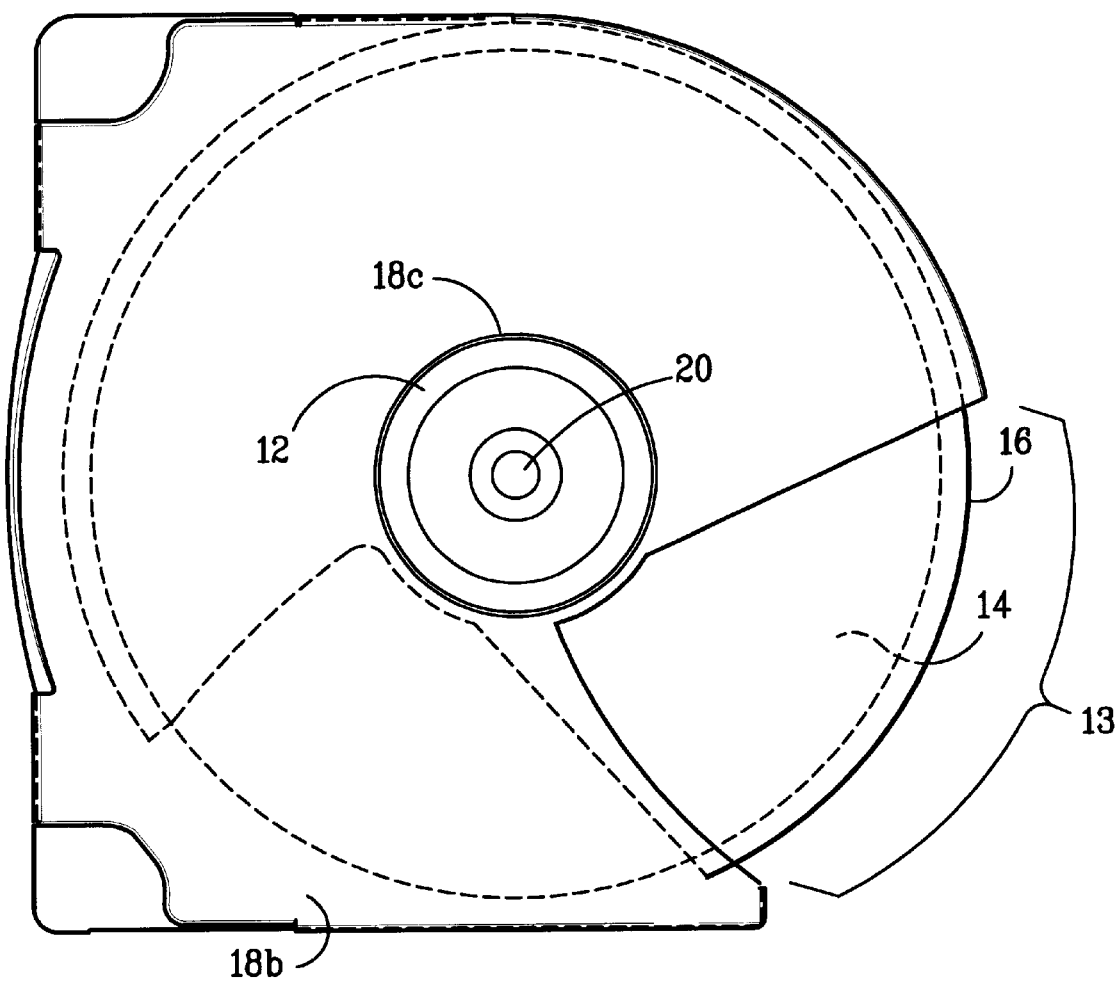

FIGS. 2C and 2D present top and bottom views, respectively, of another exemplary disk cartridge 10 for use with a drive in accordance with the present invention. The disk cartridge 10 comprises a flexible magnetic storage media 14, a storage media hub 12, top and bottom cartridge shell halves 18a and 18b, a rotary shutter 16, and a shutter pivot pin 20. The shutter 16 is rotatably disposed in cartridge 10 to selectively cover and expose disk access opening 13. In the open position, shutter 16 is rotated away from a generally wedge shaped disk access opening 13 that is formed in cartridge shell 18, exposing the top and bottom surfaces of media 14 for access by a read/write head or heads 46 contained within the disk drive 50. In the closed position, shutter 16 is rotated over disk access opening 13, sealing disk cartridge 10 and protecting media 14. The flexible magnetic storage media 14 is preferably formed of a thin polymer film, such as MYLAR, and has a thin magnetic layer uniformly dispersed on the top and bottom surfaces. The magnetic surfaces magnetically sensitize the flexible storage media 14 and enable the storage of digital data when the surface is brought into magnetic communication with a magnetic transducer of the type commonly found in disk drives. Storage media 14 is generally circular with a circular hole proximate its center.

The media hub 12 is firmly secured to storage media 14 such that the center of hub 12 is aligned proximate the center of media 14. The media hub 12 is preferably attached to storage media 14 via a conventional adhesive process. The storage media and hub assembly are rotatably disposed between upper and lower cartridge shell halves 18a, 18b. Lower cartridge shell half 18b has a substantially circular spindle access opening 18c such that a disk drive 50 can provide rotational power to storage media 14 via hub 12.

Figure 3:
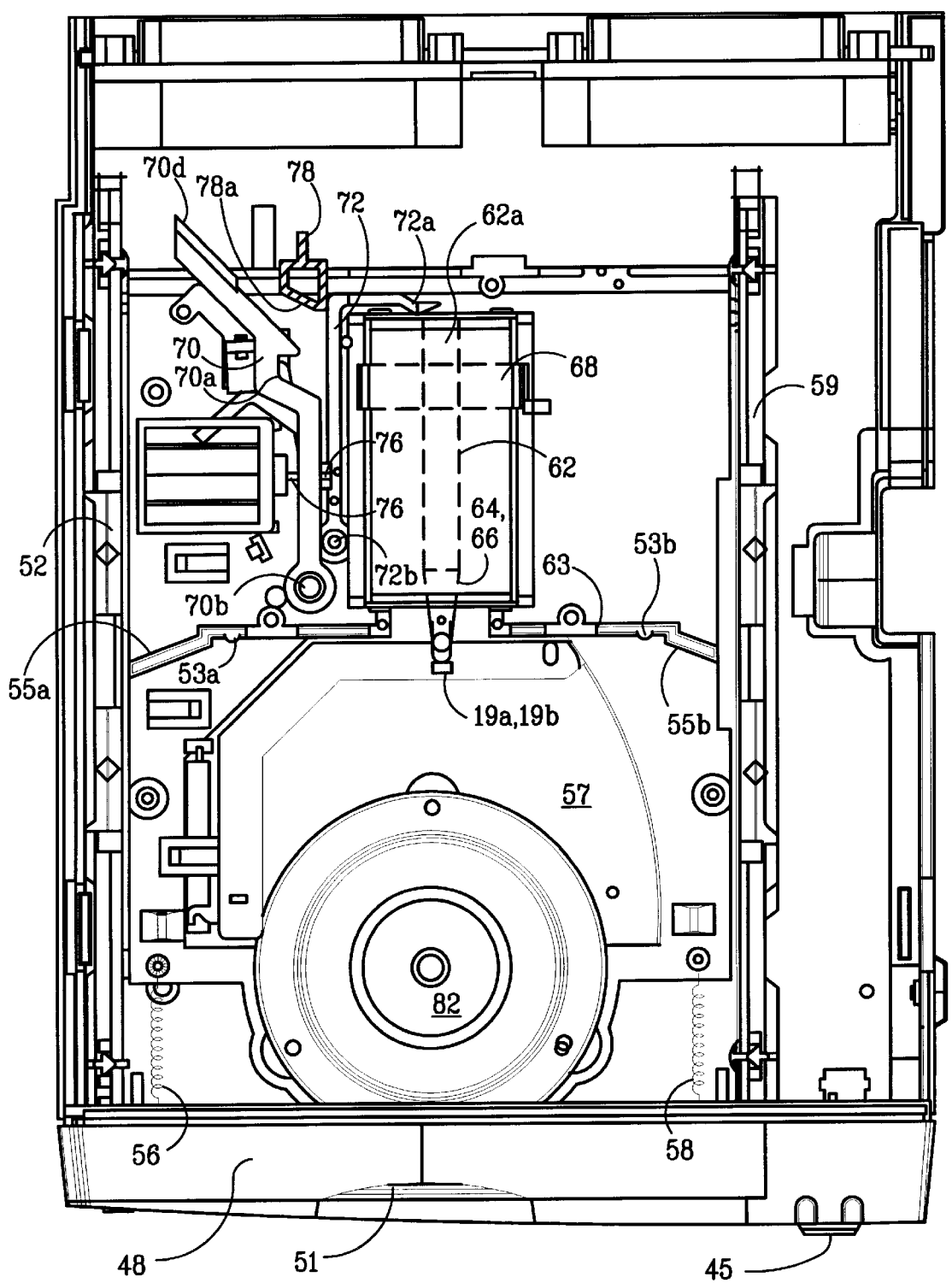
FIG. 3 is a top view of the disk drive of FIG. 1 with a top cover of the device housing removed.

FIG. 3 is a top view of the disk drive 50 of FIG. 1 with the top cover 54 removed. The disk drive 50 comprises an internal platform 57 that slides along opposing side rails 52, 59 between a forward position and a rearward position. A pair of springs 56, 58 bias the platform 57 toward its forward position.

An actuator 60, which in the preferred embodiment comprises a linear actuator, is mounted to the rear of the platform 57. The linear actuator 60 comprises a carriage assembly 62 having two lightweight flexible arms 64, 66. The recording heads 19a, 19b of the disk drive are mounted at the ends of the respective arms 64, 66. A coil 68, which is part of a voice coil motor, is mounted at the opposite end of the carriage 62. The coil 68 interacts with magnets (not shown) to move the carriage linearly so that the heads 19a, 19b can move radially over respective recording surfaces of a disk cartridge inserted into the disk drive. Additional details of the linear actuator 60 are provided in co-pending application Ser. No. 08/324,599, filed Oct. 18, 1994, entitled "Actuator for Data Storage Device", which is incorporated herein by reference.

A raised wall 63 is formed on the platform. The raised wall 63 extends across the width of the platform 57, perpendicularly to the direction of motion of the carriage 62. The raised wall 63 defines an eject member that engages the front peripheral edge of the disk cartridge 10 upon insertion of the disk cartridge into the disk drive. The opposite side edges 55a, 55b of the eject member are angled in the same manner as the opposite front corners 20c, 20d of the disk cartridge 10. Thus, the shape of the eject member mirrors the contour of the forward end face of the cartridge. As further shown, the front surface of the eject member 45 has a pair of projections 53a, 53b positioned near the angled surfaces 55a, 55b.

The disk drive 50 further comprises a spindle motor 82 capable of rotating the recording medium of a disk cartridge at a predetermined operating speed. In the present embodiment, the spindle motor 82 is coupled to the platform 57. As described hereinafter, when a disk cartridge is inserted into the disk drive, the hub 12 of the disk cartridge engages the spindle motor 82 of the disk drive 50 when the platform reaches its rearward position.

According to the present invention, as embodied in the disk drive 50 illustrated herein, the disk drive 50 comprises a first movable member movably mounted in the disk drive for performing a respective function. In the embodiment described herein, the first movable member comprises an eject latch lever 70 movably mounted within the disk drive 50. As described hereinafter, the eject latch lever 70 functions to releasably latch the platform 57 in its rearward position. In the present embodiment, the eject latch lever 70 is pivotally mounted on the platform 50 about a rotation shaft 70b. A first spring (not shown) is coupled to the eject latch lever 70 (i.e., first movable member) at the rotation shaft 70b in order to bias the lever 70 in a first direction (e.g., the $X^+$ direction). The eject latch lever 70 has a cutout 70a adapted to releasably engage a latch projection 78 as the platform 57 moves backward into its rearward position. The biasing force of the first spring urges the eject latch lever 70 into this latched position. In the preferred embodiment, the latch projection 78 is formed as part of the top cover 54 (not shown) of the disk drive 50.

Further in accordance with the present invention, the disk drive 50 comprises a second movable member movably mounted within the disk drive 50. In the embodiment described herein, the second movable member comprises a head locking lever 72 that is pivotally mounted on the platform 57 about a rotation shaft 72b. As described hereinafter, the head locking lever 72 functions to lock and unlock the carriage 62 of the linear actuator 60. A second spring (not shown) is coupled to the head locking lever 72 (i.e., second movable member) at its rotation shaft 72b to bias the head locking lever 72 in the same direction as the eject latch lever 70 (i.e., the $X^+$ direction). An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 19a, 19b.

A single electromechanical device, which in the preferred embodiment comprises a solenoid 74, is mounted on the platform 57 and has a drive shaft 76. When the solenoid 74 is energized by an electrical current, the drive shaft 76 moves in the $X^-$ direction from a normally extended position toward a retracted position. As the drive shaft 76 of the solenoid 74 moves toward its retracted position, an enlarged operating end 76a of the drive shaft 76 engages the first and second movable members (e.g., eject latch and head locking levers 70, 72) in order to pull the members in the $X^-$ direction against the respective biasing forces of the first and second springs.

Figure 4:
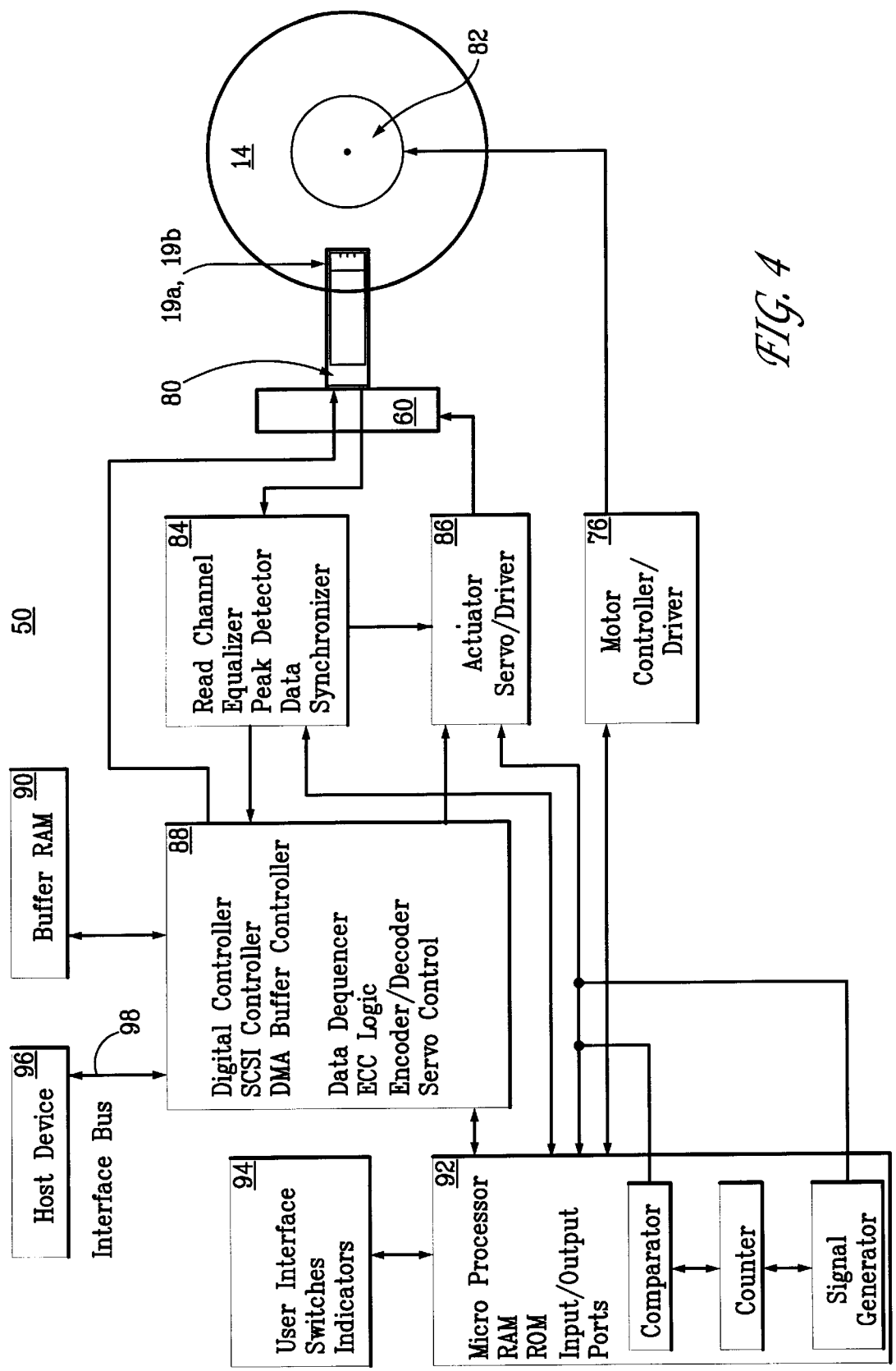
FIG. 4 is a block diagram illustrating further details of the disk drive of FIG. 1 in accordance with the present invention.

FIG. 4 is a block diagram of the electronic components of an exemplary disk drive 50 in accordance with the present invention. As shown, the disk drive 50 comprises a spindle motor 82, motor controller/driver 76, read/write heads 19a, 19b, read/write pre-amp 80, read channel 84, actuator 60, actuator servo/driver 86, digital controller 88, random access memory (RAM) buffer 90, microprocessor 92 and user interface components 94. The disk drive 50 connects to a user's host device 96 through an interface bus 98.

The motor controller/driver 76 and spindle motor 82 rotate the storage media of the cartridge 10 at a constant speed, allowing the read/write heads 19a, 19b to "fly" close to the rotating storage media for a stable recording environment.

The read/write pre-amp 80 amplifies the signals picked up by the heads 19a, 19b during read operations and switches current in the heads 19a, 19b during write operations. The read channel 84 shapes the pulses from the pre-amp 80, qualifies the peaks that represent the user data and special information, and generates a clock that is synchronous with the data coming off the storage media.

The actuator servo/driver 86 demodulates servo information recorded on storage media and compensates to position the read/write heads 19a, 19b precisely on a selected track of the data storage media.

The digital controller 88 decodes and error checks the data from the read channel 84 and stores the data temporarily in a buffer memory. The controller 88 also ensures that data is written to, or read from, the correct track and sector of storage media. The controller 88, when directed by the microprocessor 92, sends data from the buffer 90 to the host device 96, or from the host device 96 to the buffer 90, in accordance with a predefined protocol, such as ATAPI (AT Attachment Packet Interface).

The microprocessor 92 controls and monitors the functions in the drive 50. The program code is preferably stored in a read-only memory (ROM), while a RAM is preferred for storing variables, flags, status information, etc. The microprocessor 92 is responsible, in large part, for controlling the disk drive in accordance with the present invention. A significant function of the microprocessor 92 is to suspend read/write operations responsive to a mechanical force. Any suitable microprocessor can be employed, such as, for example, a Motorola 68HC16 microprocessor or an Intel 8032 microprocessor.

Figure 5:
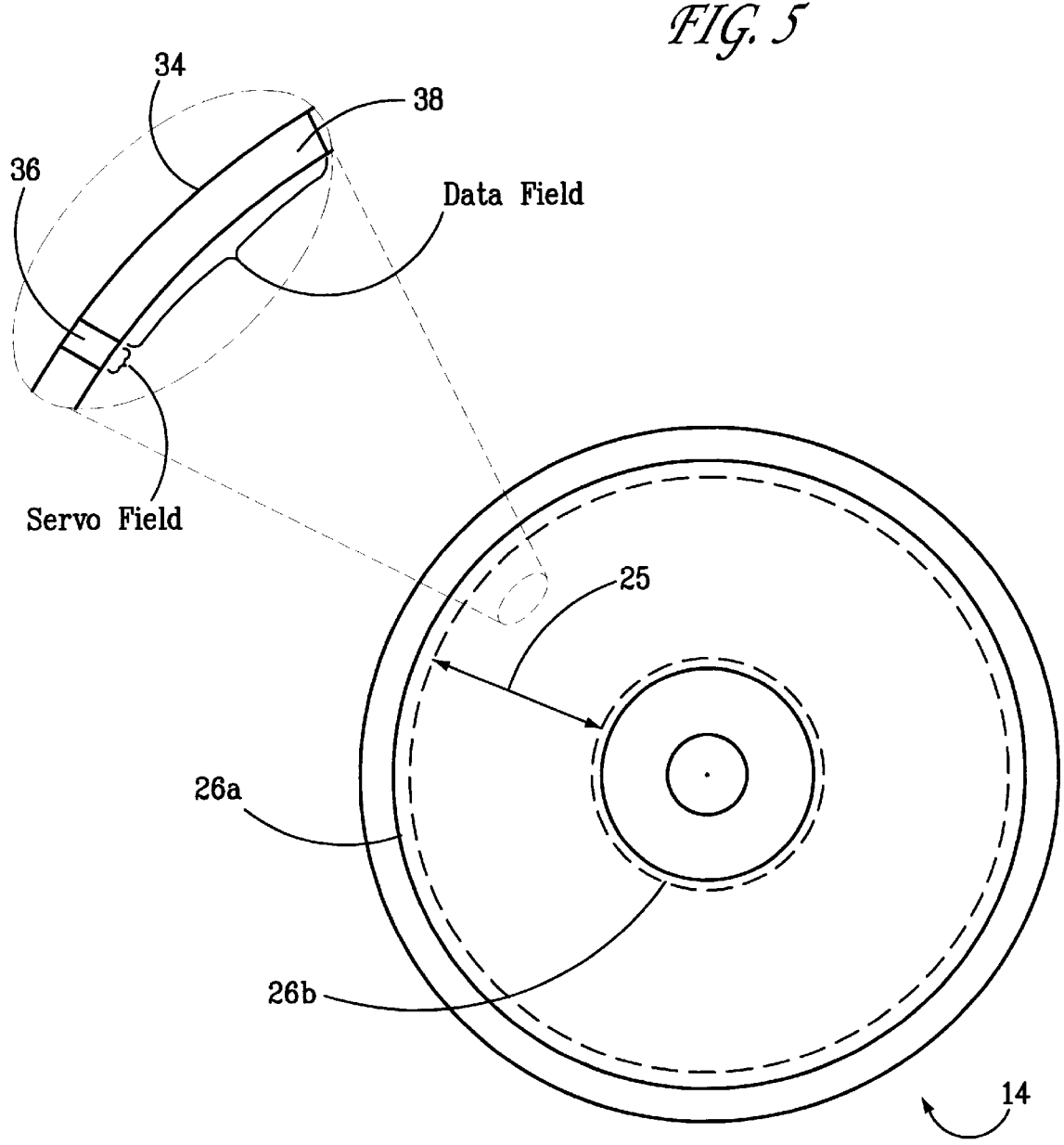
FIG. 5 shows a disk-shaped storage media of the disk cartridge of FIG. 2A containing an exemplary data structure.

Referring now to FIG. 5, an exemplary disk-shaped storage media 14 in accordance with the present invention is depicted. The storage media 14 comprises a disk having a magnetic coating for writing and reading information to and from the storage media 14. Preferably, information can be written on both sides of the storage media 14. While magnetic media is preferred, other media can be employed, and the present invention is by no means limited to use of magnetic storage media. For example, the storage media 14 can be a re-writeable optical storage media or a magnet-optical storage media.

In a preferred embodiment, the storage media 14 has a band of concentric data tracks 25 which can be written to, and read from, a user's host computer device, such as a computer, a digital camera, or the like. The concentric data tracks 25 may have a variety of track densities. In addition to the data tracks 25, preferably there are at least two special information tracks 26a, 26b on each side of the storage media (only one side is shown in FIG. 5), called Z-tracks, that contain information, such as the defect characteristics of that particular storage media. The information contained on these tracks is preferably identical and, in fact, is preferably repeated in at least two separate locations on each track 26a, 26b. This redundancy helps to ensure that the information is available, even if some areas of the storage media 14 become damaged and unreadable.

Each data track in the band of data tracks 25 preferably contains sectors 34 that comprise a servo field 36 and a data field 38. Preferably, the data field 38 comprises 512 bytes; however, in other embodiments, the data field 38 can comprise a different number of bytes. The servo field 36 is used to determine the position error signal (PES) to adjust the position of the read/write heads to follow the center of the track. The PES is also used in accordance with the present invention to determine if a mechanical shock has occurred and to suspend read/write operations until the mechanical shock and its associated vibrations have subsided.

If the PES exceeds an off-track threshold for a predetermined number of servo samples, e.g., three samples, the read/write is suspended for a predetermined duration, e.g., ten samples or approximately three seconds. The predetermined duration allows for the mechanical shock or disturbance to abate and allows the heads to settle with respect to the track. The inventors have found that the off-track threshold is exceeded for several servo samples early into the shock pulse, and then, during the subsequent vibration and bouncing around, the off-track threshold frequently is not exceeded, although the undesirable vibration and bouncing is continuing. Thus, the off-track threshold being exceeded for several servo samples is used as an indicator of the mechanical force and subsequent undesirable vibration. The writes can then be suspended for the predetermined duration, thereby avoiding overwriting data on adjacent tracks.

Figure 6:
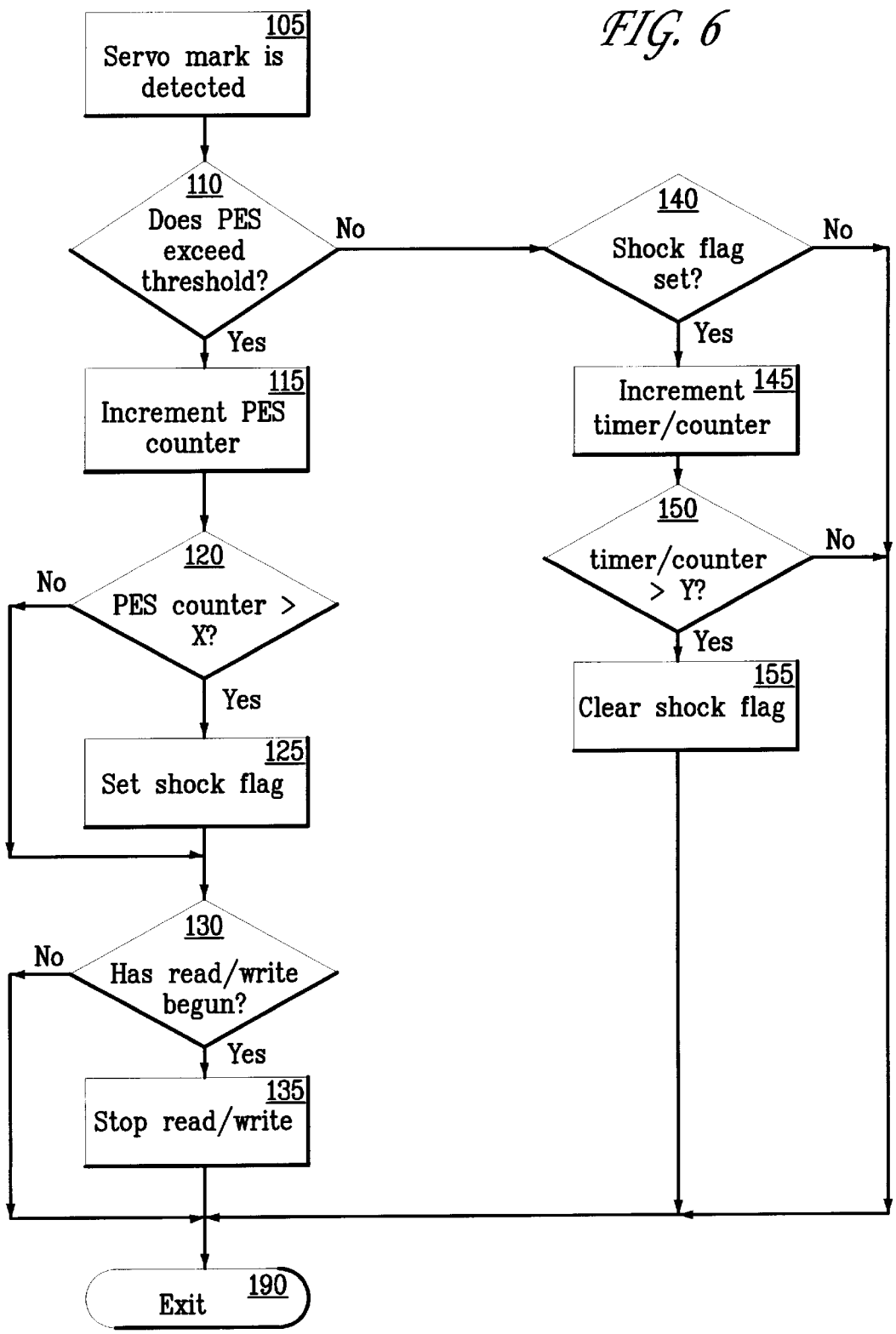
FIG. 6 is a flow diagram illustrating an exemplary method of detecting a mechanical shock and suspending operation of the read/write head in accordance with the present invention.

FIG. 6 is a flow diagram illustrating an exemplary method of detecting a mechanical shock and suspending operation of the read/write head in accordance with the present invention. At step 105, a servo field or mark is read by a head 19a, 19b as the head 19a, 19b passes over the track. The read/write pre-amp provides the servo information to the actuator servo/driver 86 which demodulates the servo information and generates a PES. The PES is transmitted to the microprocessor 92. The microprocessor 92 determines at step 110 if the PES exceeds a predetermined threshold. The predetermined threshold is the boundary at which overwriting to an adjacent track is likely to occur.

If the PES threshold is exceeded at step 110, then a PES counter is incremented at step 115. If the PES counter is not greater than a predetermined number X, at step 120, then it is determined that a mechanical shock has not occurred. However, because the PES has exceeded the threshold, writing is desirably stopped for the present sample if it has begun. Accordingly, processing continues at step 130 which determines if a read/write has begun. If not, then there is no possibility of overwriting on adjacent tracks, and the routine exits at step 190, and the disk drive continues with its typical operation. If the read/write has begun, then the read/write is stopped, at step 135. The routine then exits at step 190. Thus, although it has not been determined that a mechanical shock has been encountered, the writing is stopped for the present sample, but is not suspended for any further samples.

The predetermined number X is representative of a threshold number of consecutive occurrences of a PES exceeding the PES threshold that is used to determine if a mechanical shock has occurred. A typical number X equals three.

If the PES counter is greater than the predetermined number X, at step 120, then it is determined that a mechanical shock has occurred, and a bit or series of bits representative of a shock flag, or other signal or indicator, is set at step 125.

After the shock flag is set, it is determined at step 130 if a read/write has begun. If not, then there is no possibility of overwriting on adjacent tracks, and the routine exits at step 190, and the disk drive continues with its typical operation. If the read/write has begun, then the read/write is stopped, at step 135, and optionally, the mechanical shock is reported, for example, to the user. The routine then exits at step 190. It should be noted that the routine of FIG. 6 is entered each time a servo mark or field is encountered on the data track.

If the PES threshold is not exceeded at step 110, then it is determined at step 140 if the shock flag is set (from a previous pass through the routine, at step 125). If the shock flag is not set, then it is determined that a mechanical shock has not been incurred, and reading/writing can proceed. In this case, the routine exits at step 190, and the disk drive continues with its typical operation. If the shock flag is set at step 140, then at step 145, a duration counter is incremented. The duration counter counts the duration that the shock flag has been set; hence, the duration that the read/write has been suspended can be determined. The read/write is suspended for an amount of time sufficient for the disk drive to return to equilibrium (i.e., for the vibrations and bouncing from a mechanical shock to cease). By incrementing the duration timer, it can be determined how many consecutive servo marks have been encountered by the read/write head since the shock flag was set. This provides an indication of how long the read/write has been suspended. Instead of using a duration counter, a timer (e.g., a clock) can be used to measure the time since the mechanical shock was detected.

After the counter is incremented at step 145, it is determined at step 150 if the counter has exceeded a predetermined duration threshold, Y. If the duration threshold is exceeded, then it is determined that the time since the shock has been sufficient to allow the system to return to equilibrium and there is no substantial danger of overwriting on adjacent tracks. Thus, the shock flag is cleared at step 155, thereby allowing for reading/writing to resume, and the routine exits at step 190. If the duration threshold is not exceeded at step 150, then it is determined that the system is still not settled, and an overwrite on adjacent tracks may occur. Thus, the read/write remains suspended, and the routine exits at step 190. It should be noted that the duration threshold Y is preferably a number of consecutive servo marks, such as 10, but can also be a time, such as approximately 3 seconds.

Figure 7:
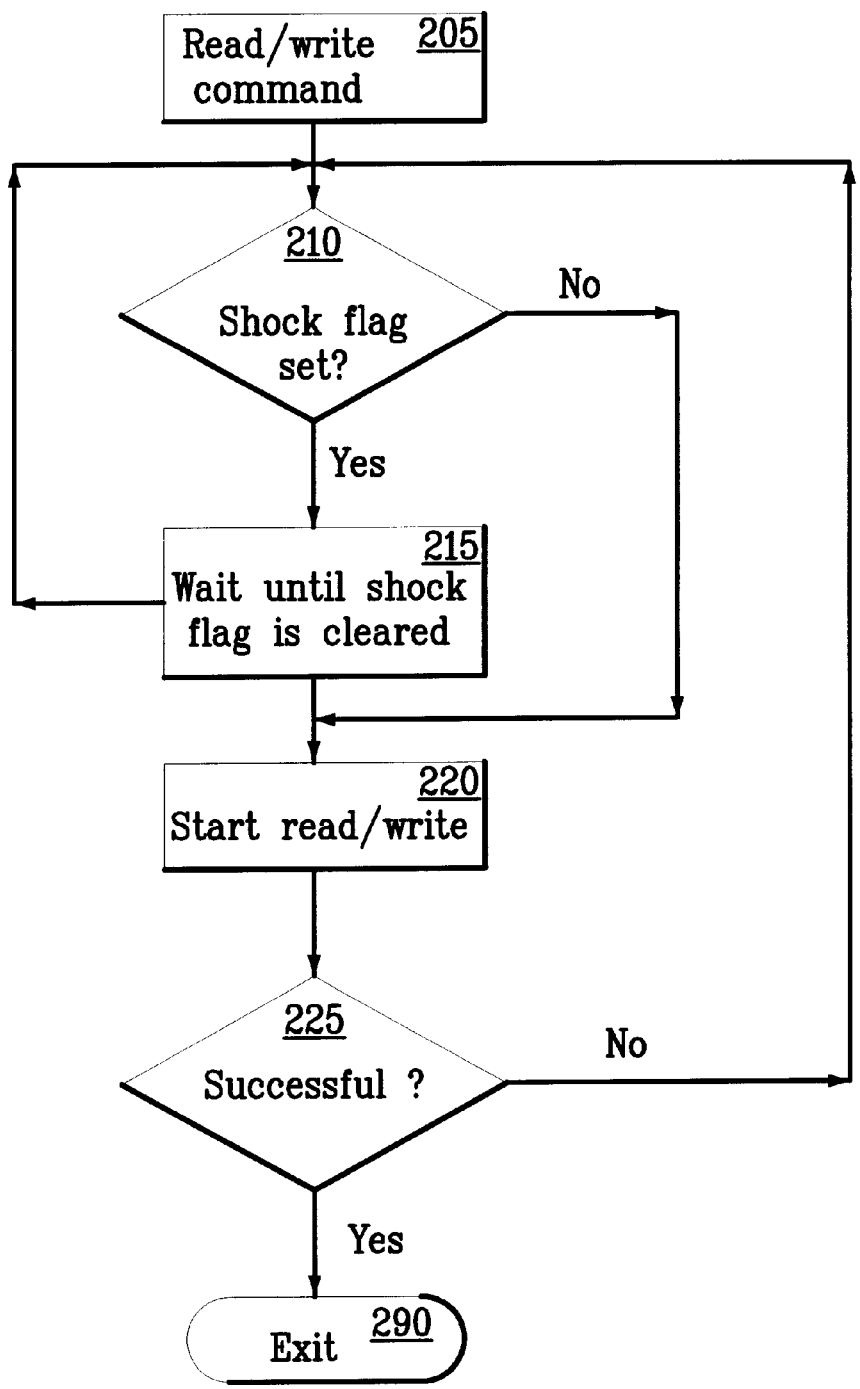
FIG. 7 is a flow diagram illustrating an exemplary method of reading/writing in accordance with the present invention.

FIG. 7 is a flow diagram illustrating an exemplary method of reading/writing in accordance with the present invention. At step 205, a read/write command is received. The system determines at step 210 if the shock flag is set. If the shock flag is not set, then reading/writing proceeds at step 220. If the read/write is successful, as determined at step 225, then the processing exits at step 290. If the read/write is unsuccessful, then processing continues at step 210 until the read/write is successful.

If the shock flag is set at step 210, then the read/write is suspended until the shock flag is cleared at step 215. The shock flag is not cleared until it has been determined that the mechanical shock and subsequent vibration and bouncing has ceased.

In accordance with another aspect of the present invention, the PES samples could be used to predict a velocity of the heads. When the velocity exceeds some allowable level, then it is determined that a mechanical shock has been incurred at the drive. The writes are the disabled for a predetermined duration.

The present invention may be employed in any data storage device and is by no means limited to uses described herein. For example, the present invention may be employed in a disk drive that has either a stationary platform, or no platform at all. Additionally, the present invention may be employed in a disk drive that has a rotary actuator as opposed to the linear actuator 60 shown and described herein. Thus, it is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed:

1. A system for disabling a servo controlled read/write head of a disk drive from writing on a track of a memory media when a mechanical shock is experienced by the disk drive, comprising:
    an actuator servo/driver that determines a plurality of consecutive position error signals (PESs) of associated samples of the read/write head with respect to the track of the memory media;
    a comparator for comparing each said PES to a predetermined threshold;
    a counter for counting a number of consecutive PESs that exceed said predetermined threshold;
    a signal generator that generates a shock signal when said number of consecutive PESs that exceed said predetermined threshold exceeds a predetermined number;
    an actuator for positioning the read/write head; and
    a controller that disables the read/write head for a predetermined duration responsive to said shock signal.

2. A method for disabling a servo controlled read/write head of a disk drive from writing on a track of a memory media when a mechanical shock is experienced by the disk drive, comprising the steps of:
    determining a plurality of consecutive position error signals (PESs) of associated samples of the read/write head with respect to the track of the memory media;
    comparing said PESs to a predetermined threshold;
    counting a number of consecutive PESs that exceed said predetermined threshold;
    generating a shock signal when said number of consecutive PESs that exceed said predetermined threshold exceeds a predetermined number; and
    disabling the read/write head for a predetermined duration responsive to said shock signal.

3. The system according to claim 1, wherein said predetermined number is three.

4. The system according to claim 1, wherein said predetermined duration is sufficient to allow the mechanical shock experienced by the disk drive to abate.

5. The system according to claim 1, wherein said actuator is a linear actuator.

6. The system according to claim 1, further comprising an indicator responsive to said shock signal for indicating the mechanical shock.

7. The system according to claim 1, further comprising a duration counter for counting a duration that said shock signal has been active.

8. The system according to claim 7, wherein said duration is one of a number of samples and a time.

9. The system according to claim 7, wherein said controller disables the read/write head until said duration counter substantially equals said predetermined duration.

10. The method according to claim 2, wherein said predetermined number is three.

11. The method according to claim 2, wherein said predetermined duration is sufficient to allow the mechanical shock experienced by the disk drive to abate.

12. The method according to claim 2, further comprising the step of activating an indicator responsive to said shock signal.

13. The method according to claim 2, further comprising the step of counting a duration that said shock signal has been active.

14. The method according to claim 13, wherein said duration is one of a number of samples and a time.

15. The method according to claim 14, wherein said step of disabling the read/write head comprises disabling the read/write head until said duration substantially equals said predetermined duration.

* * * * *